(12) United States Patent
Fen et al.

(10) Patent No.: US 8,380,806 B2
(45) Date of Patent: Feb. 19, 2013

(54) SYSTEM AND METHOD FOR ABSOLUTE PATH DISCOVERY BY A STORAGE VIRTUALIZATION SYSTEM

(75) Inventors: Xie Fen, Cupertino, CA (US); Mingzhou Joe Sun, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 302 days.

(21) Appl. No.: 11/904,802

(22) Filed: Sep. 28, 2007

(65) Prior Publication Data

US 2009/0089395 A1    Apr. 2, 2009

(51) Int. Cl.
*G06F 15/173* (2006.01)
(52) U.S. Cl. ........ 709/216; 709/223; 711/202; 711/148; 707/E17.005
(58) Field of Classification Search .................. 709/203, 709/212, 213, 223
See application file for complete search history.

(56) References Cited

U.S. PATENT DOCUMENTS

| | | | | |
|---|---|---|---|---|
| 5,832,527 | A * | 11/1998 | Kawaguchi | 1/1 |
| 6,968,345 | B1 * | 11/2005 | Muhlestein | 707/824 |
| 7,055,014 | B1 * | 5/2006 | Pawlowski et al. | 711/202 |
| 7,293,152 | B1 * | 11/2007 | Srinivasan et al. | 711/202 |
| 7,747,836 | B2 * | 6/2010 | Rajan et al. | 711/203 |
| 2003/0005248 | A1 * | 1/2003 | Selkirk et al. | 711/165 |
| 2005/0033777 | A1 * | 2/2005 | Moraes et al. | 707/202 |
| 2006/0212746 | A1 * | 9/2006 | Amegadzie et al. | 714/6 |
| 2007/0033191 | A1 * | 2/2007 | Hornkvist et al. | 707/9 |
| 2008/0147836 | A1 * | 6/2008 | Littlefield et al. | 709/223 |

OTHER PUBLICATIONS

Arch Mott (Link Globally, Act Locally: A Centrally Maintained Database of Symlinks) MIPS Computer Systems, Inc, Sep. 30-Oct. 3, 1991.*

* cited by examiner

*Primary Examiner* — Yves Dalencourt
(74) *Attorney, Agent, or Firm* — Dergosits & Noah LLP; Todd A. Noah

(57) ABSTRACT

A system and method provides for enabling a storage virtualization system to dynamically discover shares on a network attached storage file system is disclosed. Certain network attached storage systems represent user shares using abbreviated symbolic path names rather than full absolute path names. These network attached storage systems can correctly map the abbreviated path address to the actual file location; however, when a storage virtualization system is implemented to manage shares or files in these shares, it cannot access these files because it does not have the absolute path address. An embodiment of the present invention provides software instructions to augment the capabilities of the storage virtualization system, enabling it to map files with abbreviated share names, and therefore provide it with the ability to access these types of network attached storage systems.

11 Claims, 2 Drawing Sheets

SYSTEM AND METHOD FOR ABSOLUTE PATH DISCOVERY BY A STORAGE VIRTUALIZATION SYSTEM

TECHNICAL FIELD

The present invention relates generally to storage virtualization systems, and specifically, to a system and method for discovering shared resource paths for network attached storage systems using common internet file system protocol.

BACKGROUND OF THE INVENTION

Managing data resources and efficient file management have become key components of any organization's information technology ("IT") practice. Files are being generated, modified and disposed of, and keeping track of the flow of these data assets may require a large amount of dedicated computing resources. Additionally, an organization may need to preserve data assets in order to remain compliant with certain regulations.

In the past, an organization may have used a collection of independent computing workstations, with each workstation housing data for a single user account. However, as organizations have grown in size, it is more common to find network attached storage ("NAS") systems for handling and managing data files. NAS systems centralize data storage, making it easier for an IT administrator to monitor and manage. In addition, NAS systems can provide workstations with access to greater data storage capacity.

Files on a NAS system may be arranged using folders and directories. An administrator may grant access to each NAS system user by creating a specific directory for each user called a "share." A share is a portion of the NAS resource, and may be a virtual portion or an actual physical portion. In order to access their share, a user may direct his or her file browser or terminal shell to a specific directory with a path address to the share. The directory structure and path name conventions may vary depending upon the protocol used on the NAS system. Specifically, two NAS system protocols include the Common Internet File System ("CIFS") (formerly Server Message Block or "SMB"), and the Network File System ("NFS"). It is well known in the art that each protocol has its own conventions and rules for performing certain tasks and organizing files.

No matter which NAS an organization adopts, it is still necessary that data stored in each file system be periodically migrated, synchronized or re-directed to optimize storage and NAS resources. Rather than tasking the NAS system with this responsibility, organizations have adopted storage virtualization systems. Storage virtualization systems have the ability to migrate data without disrupting the usage of that data during migration. Some storage virtualization systems can copy and move a file from one NAS system (the primary system) to another NAS storage device (the secondary system) while a user is working on that file. Some storage virtualization systems can re-direct file storage from a primary NAS system to a secondary NAS system without the user even knowing. The storage virtualization system abstracts the logical volume or file name from the physical location of the file. What is left on the primary NAS system is metadata or a pointer associated with each file that points to or describes the location of the actual content of the file. If the content is moved, then the metadata is updated by the storage virtualization system.

In order for a storage virtualization system to be fully effective, it must be able to: (1) communicate and be fully compatible with the primary NAS system; (2) follow files from the client to the share on the primary NAS system; (3) access these files and migrate them to the destination server; and (4) resolve the physical storage location for a file when it is given the logical location or symbolic link to that file. However, because different NAS systems adopt different protocols, a storage virtualization system may encounter problems when trying to manage multi-protocol data assets or NAS systems provided by multiple vendors.

One skilled in the relevant art will appreciate that different NAS systems may apply different protocols to refer to the locations of user shares. For example, some NAS systems may adopt a single "home" directory structure such that users can access their shares, or files within their shares, using logical names or symbolic syntax rather than physical or absolute path addresses. For example, some CIFS NAS systems substitute abbreviated path addresses for shares. A user's files will appear to reside in a single centralized share subdivided by user name or login name. The path address will lack the subdivisions that reveal the true location of the file. A user may only need to refer their share name in the home directory to access files, and the NAS system will resolve the logical path address and will direct the user to the true location of their share on the server (the absolute file path).

This type of NAS system may have an internal mapping database that lists the physical locations of a user's actual files. This mapping database may be shared by all applications associated with the NAS, such as the data mover agent. Alternatively, each application associated with the NAS may store its own mapping database that it uses to locate files. In either case, when a user attempts to access a particular share using a home directory name and user name, the NAS system will search a database to match these credentials to an absolute path address. If the home directory name and user name are found in the database, then the user is directed to the appropriate share as if the user entered the absolute path address. If the domain name and user name is not found, then the user will be denied access.

While this convention may ease file manipulation for the user of a primary NAS system, it makes it impossible for a storage virtualization system to access a user's files. The storage virtualization system does not have access to the mapping database or databases, and therefore cannot resolve the physical locations or absolute path addresses for NAS systems that adopt a single home directory or similar symbolic logical share syntax.

What is therefore needed is a way to enable storage virtualization systems to resolve true path addresses for NAS systems that utilize the home directory share convention. The solution must not be overly burdensome to existing NAS systems or the storage virtualization system. Further, the solution should maintain the transparency inherent in a storage virtualization system while mapping users to their actual shares.

BRIEF DESCRIPTION OF THE FIGURES

The present invention is illustrated by way of example and not limitation in the figures of the accompanying drawings, in which like references indicate similar elements, and in which.

DETAILED DESCRIPTION OF THE INVENTION

An embodiment of the present invention may provide a system and method for adding file management functionality to certain storage virtualization systems. Specifically, an embodiment of the present invention may enable a storage virtualization system to access shares on NAS systems that utilize a symbolic path name syntax, such as a home directory, instead of an absolute path or location-based path address syntax. One skilled in the relevant art will appreciate that since a storage virtualization system may act as an intermediary between a client computer and the NAS system, the storage virtualization system must be able to interact with a number of different network attached storage protocols, including NFS and CIFS. Specifically, one will appreciate that a storage virtualization system must be able to map the shares of different types of NAS systems.

Figure 1:
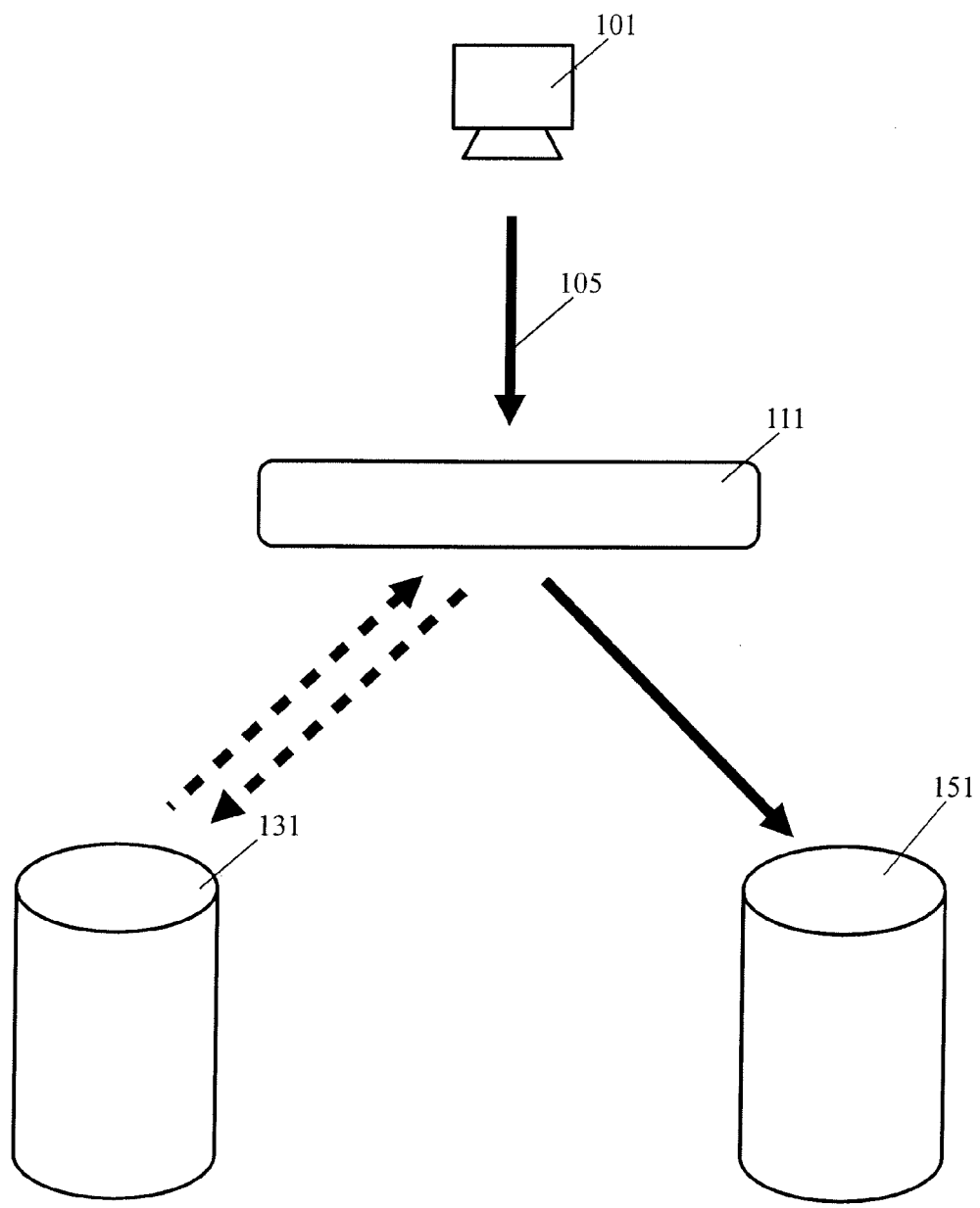
FIG. 1 is an exemplary block diagram depicting the elements of a storage virtualization system, according to one embodiment of the present invention.

FIG. 1 illustrates one exemplary setup for a storage virtualization system. The client 101 accesses a primary NAS system 131 connected to a network 105. The storage virtualization system 111 is an intermediary that may cause data from the NAS system 131 to be re-directed, migrated or copied to the secondary NAS system 151. One will appreciate that FIG. 1 is merely an example of how a storage virtualization system 111 might interact with a primary NAS system 131 and a secondary NAS system 151, and that other setups are possible without departing from the scope of the present disclosure.

In one embodiment of the present invention, a user may store files on a NAS 131 that utilizes a CIFS home directory feature. In this aspect, a user will access shared resources on the NAS 131 in order to create, modify or save files. Shared resources, or shares, are identified and are accessed by path address. In some instances, this may follow the path address format: "\\<server_name>\<share_name>\<user_name>". Thus, in order to access files, the user may have to ascend through each directory in order to reach the final share location. In some NAS systems, share names have been simplified because the full path name may be unwieldy or too complicated for a user, or the system has been set up in order to provide dynamic movement of shares without having to update the user with new path addresses. As such, rather than specify the mount point, destination, location or address for a share, the user may simply be able to refer his share using a domain name and login name: //<domain>/<login> or even //home/<login>. The NAS system will be able to map the share to the correct location by mapping the login information to the correct absolute path. To accomplish this, a database may be stored internally that contains the absolute path for each share.

In some systems, the domain name is given a default name, such as the home or HOME directory. In these systems, all users will appear to log into the same domain, HOME, when in fact the paths may be different. The domain names are invisible to the user to prevent confusion. Each data mover, virtual data mover, and the like will be able to resolve the true path for the user's share by accessing an internal mapping database of file system paths that has been set up for this type of "special share" situation. The file system path may be held in the metadata for a file, or other similar associative method known in the art.

When a storage virtualization system is implemented to perform data migration or other such services on the system that uses the special share convention, it will not have access to the same internal mapping database. It will not be able to resolve the paths for each file system. It will not be able to access a user's share, which frustrates the purpose of the storage virtualization system.

In order to properly resolve a user's share in a NAS system that uses this special share naming convention, the present invention may enable the storage virtualization system to adopt the identity of a user in order to resolve the full path for the user's share. Since a storage virtualization system is an intermediary system that causes data storage to be transferred from a primary NAS system to a secondary NAS system, it is not uncommon for the storage virtualization system to impersonate a user. As the user, the storage virtualization system will be able to ensure that file attributes and permissions are kept consistent between the primary and secondary NAS system. If the storage virtualization system uses an alternate account, such as the root or administrator account, then the file attributes may not be consistent. Since the storage virtualization system already has the ability to impersonate a user account, the present invention may be easily added to current storage virtualization systems without requiring extensive re-programming.

Figure 2:
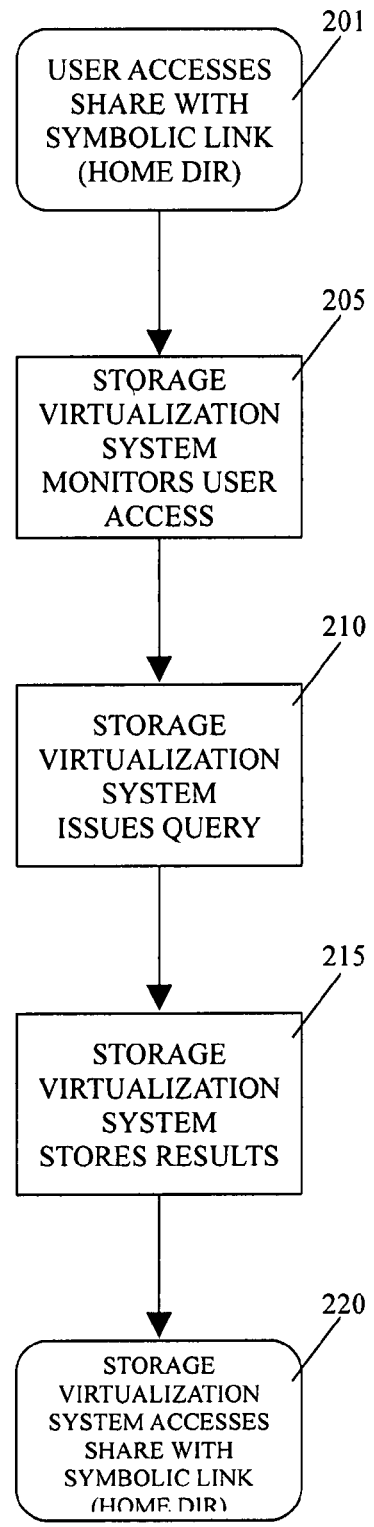
FIG. 2 is an exemplary flow diagram illustrating the various steps of an embodiment of the present invention.

The present invention therefore adds additional functionality to existing storage virtualization systems that may cause the system to be aware of when a user connects to a share with a symbolic home directory path name. This is illustrated in step 201 of FIG. 2. The storage virtualization system may monitor user activity specific to certain NAS systems in order to appropriately perform aspects of the present invention (step 205). Once a user has accessed this share, an aspect of the present invention may cause the storage utilization system to issue a query to discover the absolute path for the user's special share (step 210). This query may be similar to the command issued by an administrator to discover the mapping for all user shares on a domain. In one embodiment of the present invention, query level 0x3fa may be used to request the necessary mapping information. One skilled in the art will appreciate that other query levels are equally useful, and that the 0x3fa query level is merely exemplary.

Another embodiment of the present invention may issue the appropriate query command while impersonating a user. In this embodiment, the present invention may record transactions by a user while he accesses his special share on the home directory. When the user is no longer accessing the share, the present invention may use the information from the recorded transaction to access the share, then issue the query command to discover the absolute path of the share. This information can then be stored with the storage virtualization server (step 215) to ensure future access to the user's files (step 220).

By enabling a storage virtualization system to issue query commands to gather mapping results, the storage virtualization system may be able to access and provide services for particular CIFS storage systems when previously, no such services were available. As such, an embodiment of the present invention extends the utility of storage virtualization systems by providing compatibility with a wider range of NAS systems. Aspects of the present invention do not burden existing NAS or storage virtualization systems, rather, the process and system described herein has low overhead and does not significantly impact existing storage virtualization systems. As such, aspects of the present invention can be readily implemented without substantial use of present information technology resources.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto. For example, while specific embodiments of the present invention are directed to CIFS NAS systems, aspects of the present invention may apply equally to other protocols of NAS systems as well without departing from the spirit of the present invention or the scope of this disclosure.

What is claimed is:

1. A method comprising:
providing a storage virtualization system that communicates with a network attached storage ("NAS") system on a network, wherein the NAS system stores at least one user share using a symbolic path name, and wherein the NAS system has an internal database that stores a corresponding absolute path name for each symbolic path name;
monitoring, by the storage virtualization system, access by the user to the user share on the NAS system;
requesting, by the storage virtualization system from the NAS system, once the user has accessed the user share on the NAS system, an absolute path name for the user share; and
receiving, by the storage virtualization system. the absolute path name from the NAS system.

2. The method of claim 1, further comprising accessing the user share using the absolute path name stored in the database.

3. The method of claim 1, wherein the NAS system is a common internet file system protocol NAS system.

4. The method of claim 1, wherein the NAS system is a network file system protocol NAS system.

5. The method of claim 1, wherein the symbolic path name is home.

6. A system comprising:
a storage virtualization system that communicates with a network attached storage ("NAS") system on a network, wherein the NAS system stores at least one user share using a symbolic path name, and wherein the NAS system has an internal database that stores a corresponding absolute path name for each symbolic path name;
a software program module with computer instructions for monitoring access by the user to the user share on the NAS system, and for requesting from the NAS system an absolute path name for the user share when the user accesses the user share;
a database accessible by the storage virtualization system for storing the absolute path name for the user share.

7. The system of claim 6, wherein the software program module further comprises computer instructions for accessing the user share using the absolute path name stored in the database.

8. The system of claim 6, wherein the NAS system is a common internet file system protocol NAS system.

9. The system of claim 6, wherein the NAS system is a network file system protocol NAS system.

10. The method of claim 6, wherein the symbolic path name is home.

11. A method for identifying an absolute path name with a storage virtualization system, comprising:
providing a storage virtualization system that communicates with a network attached storage ("NAS") system on a network, wherein the NAS system stores at least one user share using a symbolic path name, and wherein the NAS system has an internal database that stores a corresponding absolute path name for each symbolic path name
recording, by the storage virtualization system, transactions by the user while the user is accessing the user share;
requesting, by the storage virtualization system from the NAS system, when the user is no longer accessing the user share, and using the information in the recorded transactions, an absolute path name for the user share; and
receiving, by the storage virtualization system from the NAS system the absolute path name.

* * * * *